United States Patent [19]

Cullen et al.

[11] 4,453,955
[45] Jun. 12, 1984

[54] DESICCANT CARTRIDGE FOR LABORATORY DESICCATOR

[75] Inventors: John S. Cullen, Buffalo; Samuel A. Incorvia; James A. Vogt, both of Tonawanda, all of N.Y.

[73] Assignee: Multiform Desiccants, Inc., Buffalo, N.Y.

[21] Appl. No.: 442,029

[22] Filed: Nov. 16, 1982

[51] Int. Cl.³ .................. B01D 53/04; B01D 53/26
[52] U.S. Cl. .................................. 55/387; 55/384; 55/501; 55/509; 55/515; 210/282
[58] Field of Search ............... 55/383, 384, 387, 389, 55/491, 501, 504, 509, 514, 515, 529, DIG. 31; 210/232, 238, 484

[56] References Cited

U.S. PATENT DOCUMENTS

| | | | |
|---|---|---|---|
| 2,562,735 | 7/1951 | Pick | 210/282 |
| 2,578,324 | 12/1951 | Southwick, Jr. | 55/387 |
| 2,581,684 | 1/1952 | McKenzie | 299/24 |
| 2,621,753 | 12/1952 | Urdahl | 55/387 |
| 2,781,913 | 2/1957 | Thompson | 55/529 X |
| 2,788,128 | 4/1957 | Heine | 210/282 |
| 3,090,490 | 5/1963 | Yocum | 210/299 |
| 3,170,872 | 2/1965 | Balogh et al. | 55/387 X |
| 3,240,567 | 3/1966 | Caparreli et al. | 55/387 X |
| 3,309,849 | 3/1967 | Ward | 55/387 |
| 3,315,447 | 4/1967 | Meier | 55/384 |
| 3,581,476 | 6/1971 | Rivers | 55/387 |
| 3,734,296 | 5/1973 | Proctor et al. | 210/288 |
| 3,785,497 | 1/1974 | Giffard | 210/282 |
| 3,799,352 | 3/1974 | McClive | 210/282 |
| 3,820,309 | 6/1974 | Cullen et al. | 55/387 |
| 3,854,912 | 12/1974 | Terrel et al. | 55/479 |
| 3,879,292 | 4/1975 | McClive | 210/282 |
| 4,139,354 | 2/1979 | Giles | 55/387 |
| 4,268,390 | 5/1981 | Cunningham | 210/232 |
| 4,272,264 | 6/1981 | Cullen et al. | 55/387 |
| 4,333,752 | 6/1982 | Thies et al. | 55/387 |

FOREIGN PATENT DOCUMENTS

| | | | |
|---|---|---|---|
| 553819 | 3/1958 | Canada | 210/282 |
| 823478 | 1/1938 | France | 55/387 |

Primary Examiner—Robert H. Spitzer
Attorney, Agent, or Firm—Joseph P. Gastel

[57] ABSTRACT

A desiccant cartridge for insertion into a laboratory desiccator having a bowl with a side wall, a concave bottom wall, a plurality of spaced projections within the side wall located proximate the concave bottom wall, a shelf supported on the projections, and a space between the shelf and the concave bottom wall, the desiccant cartridge having a convex bottom wall and a planar perforated top wall joined by a seam, a plurality of circumferentially spaced indentations in the cartridge for placement in mating relationship with the projections, and desiccant confined between the bottom and top walls, the desiccant cartridge being located in the space below the shelf with its convex bottom wall in contiguous relationship to the concave bottom wall of the bowl and with its top wall being spaced from the shelf.

17 Claims, 6 Drawing Figures

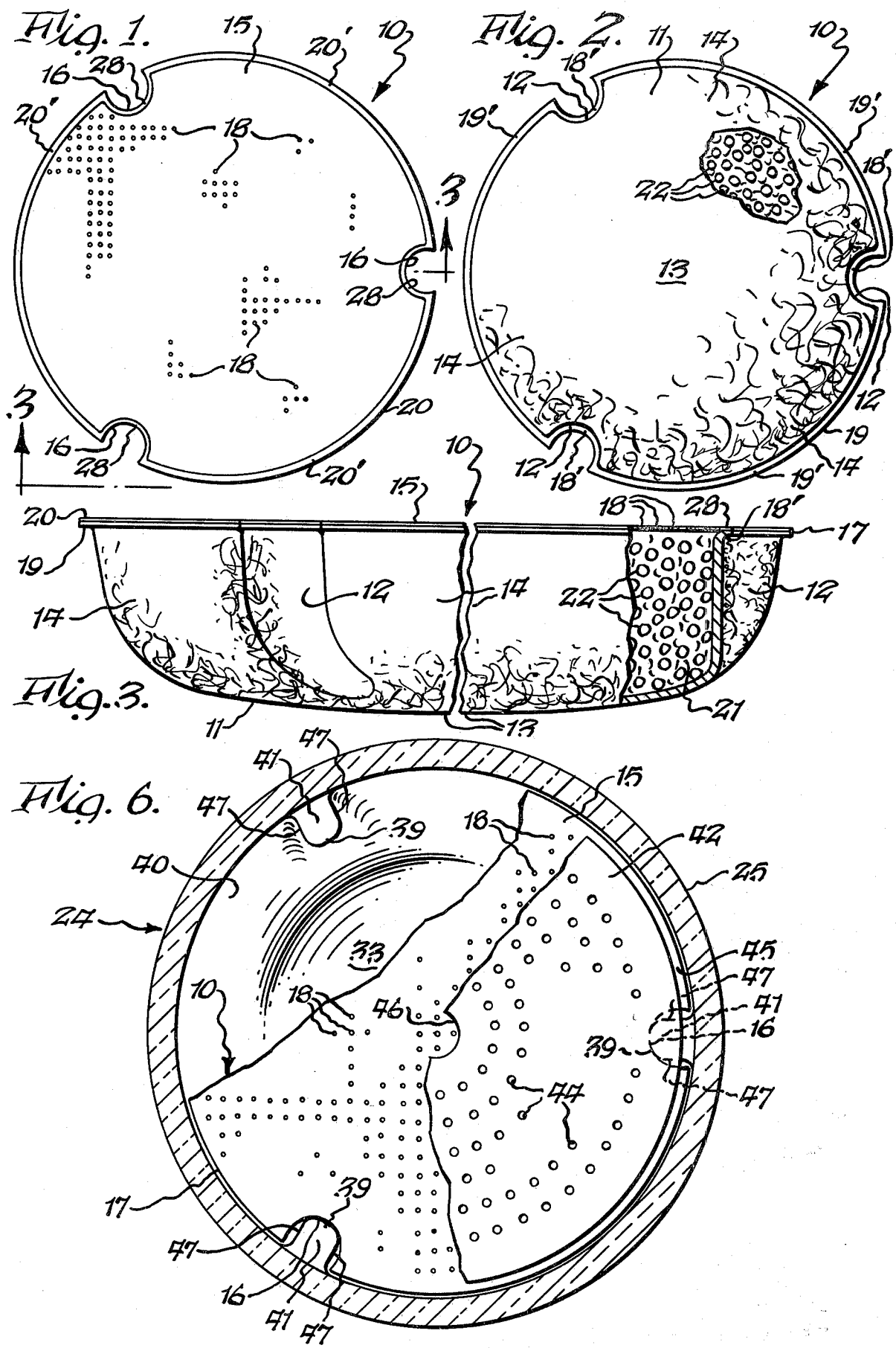

DESICCANT CARTRIDGE FOR LABORATORY DESICCATOR

BACKGROUND OF THE INVENTION

The present invention relates to a desiccant cartridge for a laboratory desiccator.

By way of background, there are in use laboratory desiccators which include a glass bowl having spaced projections on the lower internal surface thereof for supporting a shelf onto which material to be desiccated is placed. A space is provided below the shelf for receiving desiccating material. In the past the desiccating material was dumped in bulk into the desiccating-receiving space. This was objectionable for a number of reasons. First of all, dust, which was generated as a result of pouring the bulk desiccant, settled onto the sealing lip of the desiccator bowl and thus interfered with proper sealing when the desiccator cover was installed. In addition, if too much desiccant was used, it would extend above the projections so that the shelf would not sit level, and if the shelf touched the top of the desiccant, it blocked the desiccating action to some extent. If too little desiccant was used, the desiccating capacity was diminished. In addition, since the desiccant touched the inside surface of the lower portion of the bowl, there was no space between the desiccant and the side of the bowl so that practically the only desiccating effect was obtained through the top of the desiccant. Additionally, handling of bulk desiccant was time-consuming and messy. It is with overcoming the foregoing deficiencies of prior art laboratory desiccators that the present invention is concerned.

SUMMARY OF THE INVENTION

It is accordingly one object of the present invention to provide a desiccant cartridge for a laboratory desiccator so that there is no need to utilize bulk desiccant.

Another object of the present invention is to provide a desiccant cartridge for a laboratory desiccator which provides an exactly measured amount of desiccant and which has its top portion spaced from the shelf in the desiccator so that the top of the desiccant cartridge is completely unobstructed.

A further object of the present invention is to provide a desiccant cartridge for a laboratory desiccator which is shaped to fit around the projections in the desiccator, thereby providing maximum utilization of the desiccant-receiving space, notwithstanding that the desiccant is confined within the walls of a cartridge.

Yet another object of the present invention is to provide a desiccant cartridge for a laboratory desiccator in which the desiccant is packed relatively loosely and the bottom wall of the desiccant cartridge is flexible so that the bottom wall can be manipulated to reposition the desiccant within the cartridge to thereby remove saturated desiccant from the area near the top of the cartridge and reposition unsaturated desiccant in that area.

Still another object of the present invention is to provide a desiccant cartridge for a laboratory desiccator in which the bottom wall of the cartridge is fabricated from porous material which may be spaced from the bottom of the laboratory desiccator so that there can be a desiccating action therethrough. Other objects and attendant advantages of the present invention will readily be perceived hereafter.

The present invention relates to a desiccant cartridge comprising a bottom wall having upwardly extending outer side portions, a substantially planar circular top wall, openings in said top wall for permitting passage of a gas, a plurality of circumferentially spaced recessed portions in said outer side portions, and desiccant confined between said walls.

The present invention also relates to an improvement in a laboratory desiccator having a bowl with a side wall, a bottom wall, a shelf having an upper side and an underside, a plurality of circumferentially spaced projections located proximate said bottom wall for supporting said underside of said shelf thereon, and a space between said shelf and said bottom wall for receiving desiccant material, the improvement comprising a desiccant cartridge comprising a cartridge bottom wall positioned in said space in contiguous relationship to said bottom wall of said bowl, outer upwardly extending side portions on said cartridge bottom wall, a substantially planar circular top wall spaced from said underside of said shelf, a plurality of circumferentially spaced recessed portions in said outer side portions for receiving said projections in mating relationship, desiccant confined between said top wall and said cartridge bottom wall, and openings in said top wall for effecting communication between said desiccant and said space between said underside of said shelf and said top wall.

The various aspects of the present invention will be more fully understood when the following portions of the specification are read in conjuction with the accompanying drawings wherein:

BRIEF DESCRIPTION OF THE DRAWINGS

FIG. 1 is a top plan view of the desiccant cartridge of the present invention;

FIG. 2 is a bottom plan view, partially broken away, of the desiccant cartridge of the present invention;

FIG. 3 is a fragmentary enlarged cross sectional view taken substantially along line 3—3 of FIG. 1;

FIG. 6 is a cross sectional view taken substantially along line 6—6 of FIG. 5 and showing parts of the laboratory desiccator and its contents broken away and at different elevations.

DESCRIPTION OF THE PREFERRED EMBODIMENTS

Figure 4:
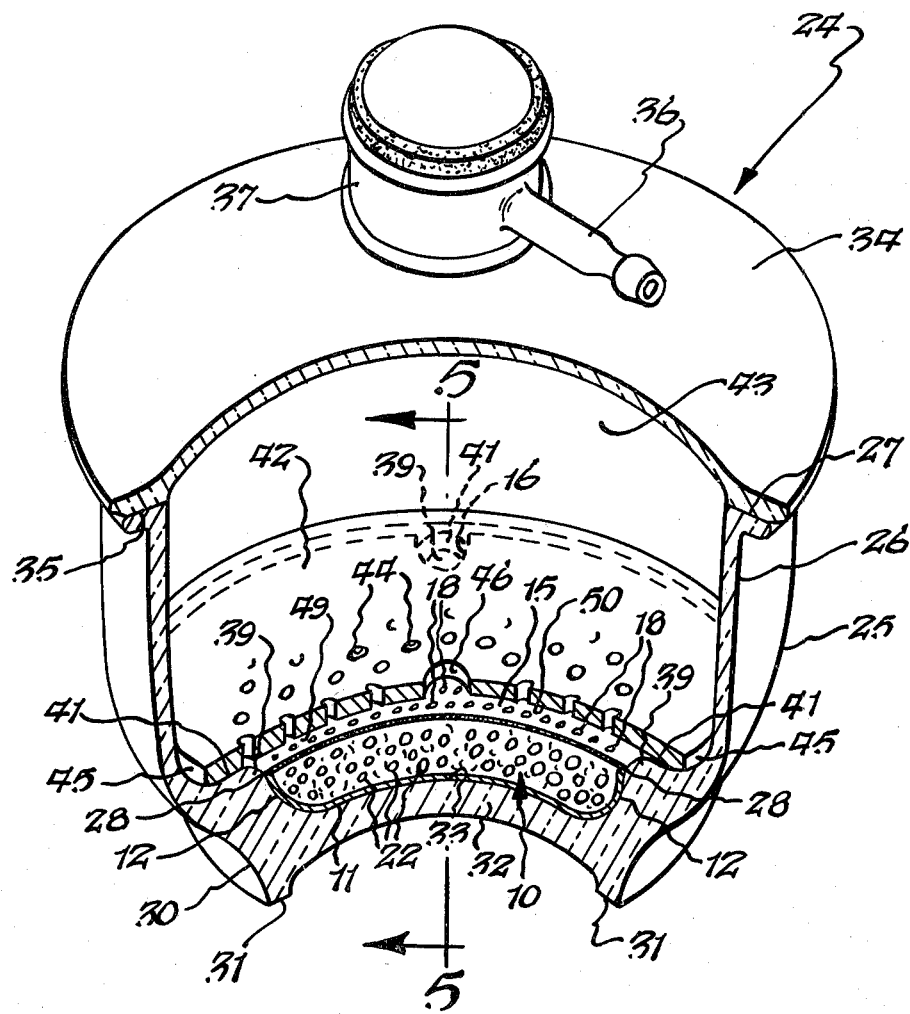
FIG. 4 is a fragmentary view, partially broken away, of a laboratory desiccator containing the desiccant cartridge of the present invention.

The improved desiccant cartridge 10 of the present invention includes a convex bottom wall 11 fabricated from porous polyester felt material and having a plurality of circumferentially spaced recessed portions 12 therein which are formed by a suitable pressing operation. The concave bottom wall includes a lowermost portion 13 which merges into upwardly curved outer side portions 14 between recessed portions 12.

The desiccant cartridge also includes an upper substantially planar wall 15 which is fabricated from a relatively stiff, yet flexible, material, such as sheet Mylar film. The wall 15 contains openings 18 in the form of perforations which are preferably about 0.062 inches in diameter and comprise a very high percentage of the total area of top wall 15. The openings 18 can take any other form which will permit gases to pass through top wall 15. Top wall 15 also includes a plurality of circumferentially spaced recessed portions 16 which are in alignment with recessed portions 12 of bottom wall 11. Top wall 15 is secured to bottom wall 13 by a seam 17 which is formed as a lap joint of edge portion 19 of lower wall 11 secured to edge portion 20 of upper wall 15. The securing may be by any suitable attachment technique which is preferably ultrasonic welding, or may be electrostitching or any other suitable mode of connection including gluing, stitching and the like. The edge portion 19 of bottom wall 11 includes three edge portions 19' which are connected by short edge portions 18' (FIG. 2). The edge portion 20 of top wall 15 includes three edge portions 20' which are connected by edge portions 28.

The chamber 21 formed between upper wall 15 and lower wall 11 is preferably loosely filled with silica gel beads but may be packed firmly, if desired. The beads are preferably of the type known as indicating silica gel beads which are blue before they absorb moisture and turn pink after they absorb moisture, thereby indicating the condition of the desiccant. When indicating beads are used, it is preferred that top wall 15 be transparent. Other desiccants, such as molecular sieve, clay, calcium oxide, calcium sulphate, etc. may be used.

Figure 5:
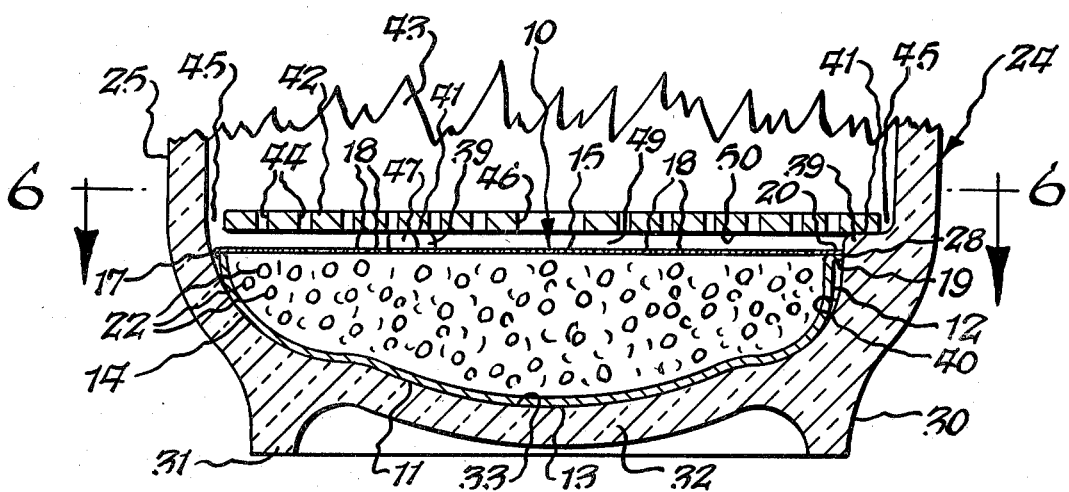
FIG. 5 is a fragmentary cross sectional view taken substantially along line 5—5 of FIG. 4.

As noted briefly above, the desiccant cartridge 10 is for use in a laboratory desiccator 24 which includes a glass lower bowl portion 25 having a generally cylindrical upper portion 26 terminating at ground lip 27 and a lower portion 30 which is curved as generally shown in cross section in FIG. 5. A circular foot 31 is located at the lowermost portion of bowl 25, and located within the foot 31 is a dished bottom wall 32 having an inner concave or dished surface 33. A glass cover 34 is provided having a ground edge lip 35 which is adapted to be placed in sealing engagement with lip 27 after a sealing grease layer is placed therebetween. Cover 34 includes the aspirating tube 36 which is attached to cover portion 37 through which the inside of the laboratory desiccator may be exhausted by the use of a suitable vacuum source.

The laboratory desiccator 24 includes a plurality of projecions 39 which are circumferentially spaced at 120° intervals along the inside surface 40 of bowl portion 30. Projections 39 terminate at an upper shelf portion 41 which support a perforated ceramic shelf which supports material to be treated within the desiccator 24.

As stated briefly above, in the past the space underneath shelf 42 was filled with loose desiccant pellets. If the space was filled too full, shelf 42 would not rest squarely on shelf surfaces 41, and therefore the items placed on shelf 42 might not stand properly. If the space between shelf 42 was not filled full enough, an insufficient desiccating effect might be obtained or the desiccant would have to be replaced more frequently. In either event the desiccant dust produced as a result of filling the desiccator would settle on lip 27 and would oppose the establishing of a good seal between it and lip 35. Furthermore, if shelf 42 rested on the desiccant pellets, the solid portions of shelf 42, would block the desiccant from acting effectively since the only way there could be communication between chamber 43 above shelf 42 and the desiccant would be through the perforations 44 and the spaces 45 and central perforation 46. In other words, there would not be the unhampered communication from chamber 43 to the entire surface of the desiccant beads below shelf 42.

The desiccant cartridge of the present invention is intended to fit as shown in FIGS. 4, 5 and 6 with the recessed portions 12:16 of the cartridge 10 in mating engagement with the outer side surfaces 47 of projections 39 (FIG. 6). By having the recessed portions of cartridge 10 mate with the projections 39, the space below shelf 42 can be filled to the fullest extent, thereby providing a high desiccating capacity, especially considering that the lower wall 11 of the desiccant cartridge is located in contiguous relationship to the inner surface 33 of dished bottom wall 32 of bowl 25. The upper wall 15 of the desiccant cartridge is located so that a clearance space 49 exists between it and the undersurface 50 of shelf 42, thereby providing for good circulation between the space 43 above shelf 42 and the top 15 of the cartridge. Top wall 15 is sufficiently stiff so that it will oppose rotary motion of the cartridge 10, thereby maintaining it in position. Furthermore, the relative stiffness of top 15 will cause it to retain its substantially planar shape, thereby preventing it from contacting the undersurface 50. This prevents destruction of the top wall in the event extremely hot items are placed on shelf 42. While the stiffness of top wall 15 is very desirable, it will be appreciated that it need not be stiff, as it can be straightened to a planar condition, if desired, after installation if it is not stiff.

As noted briefly above, the desiccant beads 22 are preferably loosely packed between walls 11 and 15. Thus, after the upper surface of the beads becomes saturated, as will be indicated by their turning pink if the indicating silica gel beads are used, the lower wall 11 can be manipulated so as to cause the beads in the central portion and at the bottom of the cartridge to be moved up closer to top wall 15, thereby in essence exposing fresher unused beads for desiccating use.

Furthermore, the bottom wall 11 is porous and there are some gaps between it and the inner portions of bowl 26 contiguous thereto so that a certain amount of desiccating action will occur through this wall also, whereas with the loose beads, this was not possible in view of the fact that the outer layer of the beads was in full contact with the inner surface of the bowl. If desired, spacers (not shown) may be located between cartridge bottom wall 11 and inner concave surface 33 so that a greater desiccating effect may be obtained by exposing a greater area of bottom wall 11 through which desiccating action can occur because of the porous nature of bottom wall 11. These spacers may take the form of cylindrical plastic buttons about $\frac{1}{2}$ inch in diameter and about $\frac{1}{4}$ inch high, the bases of which are suitably secured at spaced intervals to the outer surface of bottom wall 11.

The specific cartridge shown in the drawings has the following parameters. Top 15 is approximately 9.25 inches in diameter and cartridge 10 is approximately 2.0 inches high. It contains 3.25 pounds of silica gel beads. The Mylar polyester top 15 is approximately 0.014 inches thick. The felted polyester bottom wall is normally 0.050 inches thick and weighs 10 ounces per square yard. The seam 17 is approximately 0.125 inches wide. The perforations in top wall 15 are 0.062 inches in diameter and are positioned in parallel rows spaced about 0.200 inches from each other and the perforations within the rows are also spaced about 0.200 inches from each other. It is to be noted that the parallel rows of perforations 18 extend throughout the top wall 15, notwithstanding that only a portion of the perforations are shown in FIGS. 1 and 6 for ease of illustration. The foregoing parameters are by way of illustration and it will be appreciated that they can be varied within the scope of the present invention.

While bottom wall 15 has been described as porous, it will be understood that this term includes any type of openings through which gases may pass to the inside of cartridge 10 and which will prevent passage of desiccant therethrough.

While a preferred embodiment of the present invention has been disclosed, it will be appreciated that the present invention is not limited thereto but may be otherwise embodied within the scope of the following claims.

What is claimed is:

1. A desiccant cartridge comprising a bottom wall having upwardly extending outer side portions, a substantially planar circular top wall, openings in said top wall for permitting passage of a gas, a plurality of circumferentially spaced recessed portions in said outer side portions, desiccant confined between said walls, a first edge portion of said outer side portions, a second edge portion on said top wall, a seam joining said first and second edge portions, and second circumferentially spaced recessed portions in said planar top wall in alignment with said recessed portions in said outer side portions.

2. A desiccant cartridge as set forth in claim 1 wherein said bottom wall is fabricated from flexible cloth-like material and wherein said desiccant is packed sufficiently loosely so that manipulation of said bottom wall can result in moving said desiccant within said cartridge to cause different portions of said desiccant to be located adjacent said top wall.

3. A desiccant cartridge as set forth in claim 1 wherein said top wall is fabricated of material which is sufficiently stiff so as to retain its substantially planar shape.

4. A desiccant cartridge as set forth in claim 3 wherein said openings are in the form of perforations.

5. A desiccant cartridge as set forth in claim 3 wherein said bottom wall is fabricated from flexible cloth-like material and wherein said desiccant is packed sufficiently loosely so that manipulation of said bottom wall can result in moving said desiccant within said cartridge to cause different portions of said desiccant to be located adjacent said top wall.

6. A desiccant cartridge as set forth in claim 5 wherein said bottom wall is porous.

7. In a laboratory desiccator having a bowl with a side wall, a bottom wall, a shelf having an upper side and an underside, a plurality of circumferentially spaced projections located proximate said bottom wall for supporting said underside of said shelf thereon, and a space between said shelf and said bottom wall for receiving desiccant material, the improvement comprising a desiccant cartridge comprising a cartridge bottom wall positioned in said space in contiguous relationship to said bottom wall of said bowl, outer upwardly extending side portions on said cartridge bottom wall, a substantially planar circular top wall spaced from said underside of said shelf, a plurality of circumferentially spaced recessed portions in said outer side portions for receiving said projections in mating relationship, desiccant confined between said top wall and said cartridge bottom wall, and openings in said top wall for effecting communication between said desiccant and said space between said underside of said shelf and said top wall.

8. In a laboratory desiccator as set forth in claim 7 including second recessed portions in said top wall in alignment with said recessed portions.

9. In a laboratory desiccator as set forth in claim 7 wherein said bottom wall is fabricated of porous material.

10. In a laboratory desiccator as set forth in claim 7 wherein said openings are in the form of perforations.

11. In a laboratory desiccator as set forth in claim 7 including a first edge portion on said outer side portions, a second edge portion on said top wall, and a seam joining said first and second edge portions.

12. In a laboratory desiccator as set forth in claim 11 wherein said cartridge bottom wall is fabricated from flexible cloth-like material and wherein said desiccant is packed sufficiently loosely so that manipulation of said cartridge bottom wall can result in moving said desiccant within said cartridge to cause different portions of said desiccant to be located adjacent said top wall.

13. In a laboratory desiccator as set forth in claim 12 wherein said cartridge bottom wall is porous.

14. In a laboratory desiccator as set forth in claim 11 wherein said top wall is fabricated of material which is sufficiently stiff so as to retain its substantially planar shape.

15. In a laboratory desiccator as set forth in claim 14 wherein said top wall is also flexible.

16. In a laboratory desiccator as set forth in claim 14 wherein said cartridge bottom wall is fabricated from flexible cloth-like material and wherein said desiccant is packed sufficiently loosely so that manipulation of said cartridge bottom wall can result in moving said desiccant within said cartridge to cause different portions of said desiccant to be located adjacent said top wall.

17. In a laboratory desiccator as set forth in claim 14 wherein said cartridge bottom wall is porous.

* * * * *

UNITED STATES PATENT AND TRADEMARK OFFICE
CERTIFICATE OF CORRECTION

PATENT NO. : 4,453,955

DATED : June 12, 1984

INVENTOR(S) : John S. Cullen, Samuel A. Incorvia & James A. Vogt

It is certified that error appears in the above-identified patent and that said Letters Patent are hereby corrected as shown below:

Column 5, line 18 (claim 1), change "of" to --on--.

Signed and Sealed this

Ninth Day of October 1984

[SEAL]

*Attest:*

*Attesting Officer*

GERALD J. MOSSINGHOFF

*Commissioner of Patents and Trademarks*